March 19, 1946.    C. G. FLYGARE    2,396,841
GRINDING MACHINE-WORK HEAD
Filed Jan. 11, 1945    2 Sheets-Sheet 1
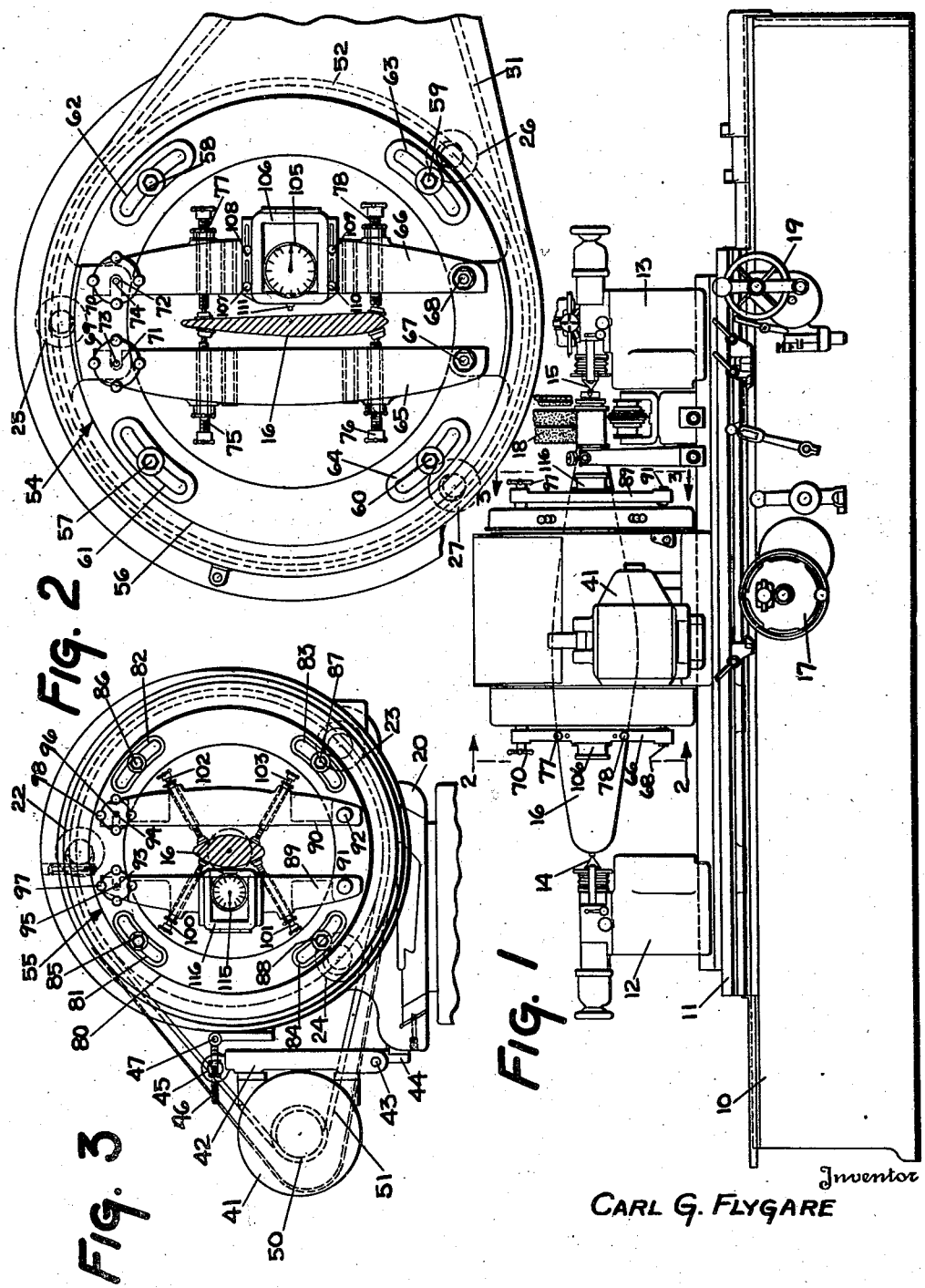
Inventor
CARL G. FLYGARE
By Harold W. Eaton
Attorney March 19, 1946. C. G. FLYGARE 2,396,841
GRINDING MACHINE-WORK HEAD
Filed Jan. 11, 1945 2 Sheets-Sheet 2
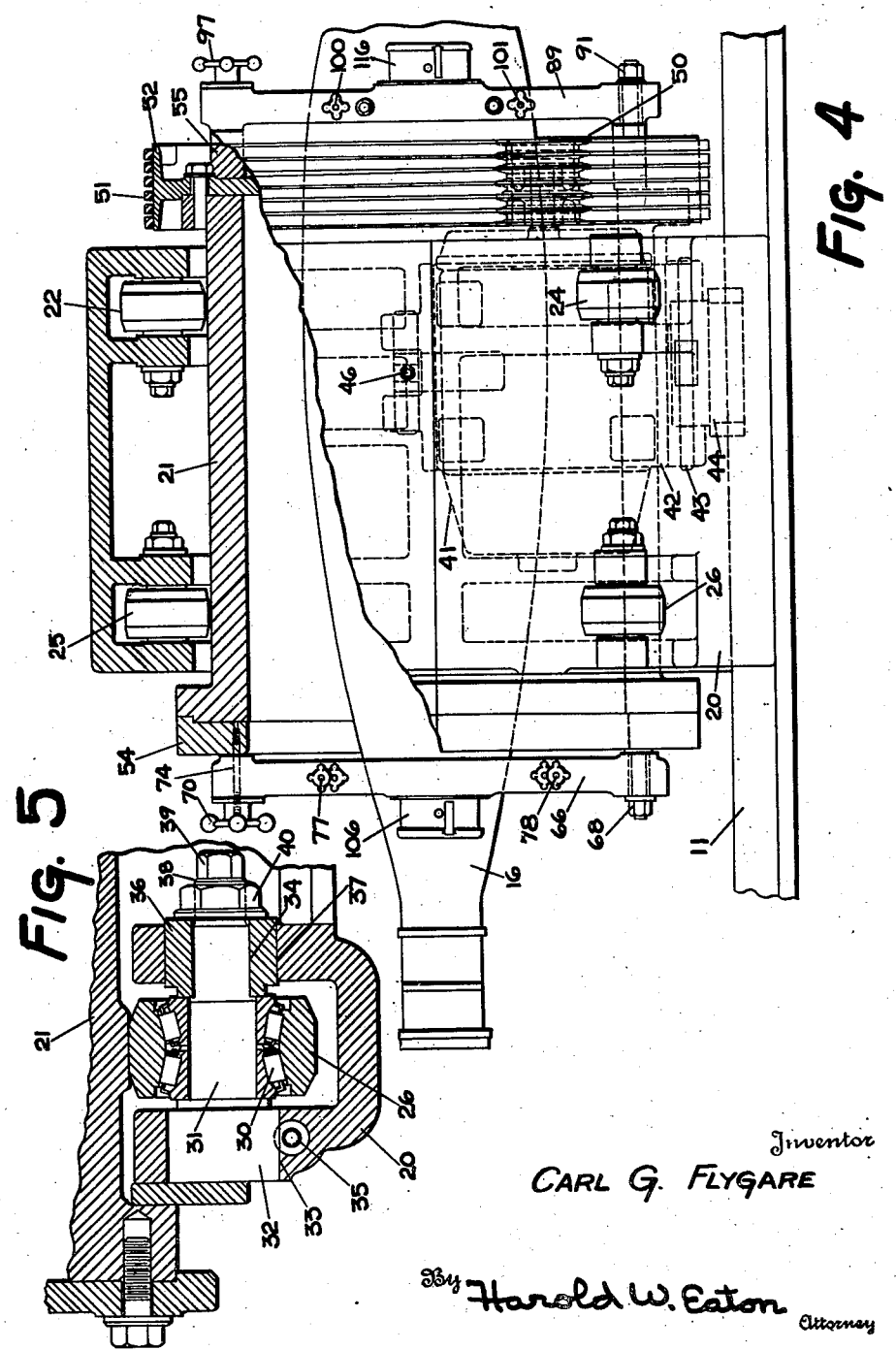
Inventor
CARL G. FLYGARE
By Harold W. Eaton
Attorney Patented Mar. 19, 1946

2,396,841

UNITED STATES PATENT OFFICE 2,396,841

GRINDING MACHINE WORK HEAD

Carl G. Flygare, Worcester, Mass., assignor to Norton Company, Worcester, Mass., a corporation of Massachusetts Application January 11, 1945, Serial No. 572,323

9 Claims. (Cl. 51—237)

The invention relates to grinding machines, and more particularly to a work head for chucking and driving a relatively long, irregularly shaped work piece.

One object of the invention is to provide a simple and thoroughly practical work head for a grinding machine for supporting and rotating a relatively long, irregularly shaped work piece during a grinding operation. Another object of the invention is to provide a work head having a hollow positively driven spindle which serves as a support for a pair of spaced relatively adjustable work supporting and centering chucks.

Another object of the invention is to provide a work supporting mechanism for a relatively long, irregularly shaped work piece comprising a pair of spaced work supporting and locating centers and a hollow positively driven spindle therebetween which supports a pair of work clamping and rotating chucks. Another object of the invention is to provide a work chucking and driving mechanism comprising a pair of spaced chucks having a plurality of clamping screws to clamp, support and rotate a work piece supported on centers.

Another object of the invention is to provide a work chucking mechanism in which the chuck is provided with a visible indicating mechanism whereby the work piece may be clamped and rotated while supported on centers without deflecting the axis of the work piece during the clamping operation. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of a grinding machine equipped with the improved work supporting and rotating mechanism;

Fig. 2 is a cross sectional view, on an enlarged scale, taken approximately on the line 2—2 of Fig. 1, showing an elevation of the left-hand work chuck;

Fig. 3 is a cross sectional view, on an enlarged scale, taken approximately on the line 3—3 of Fig. 1, showing an elevation of the right-hand work chuck and the chuck driving mechanism;

Fig. 4 is a rear elevation, on an enlarged scale, partly broken away and shown in section, of the improved work supporting and rotating mechanism; and Fig. 5 is a longitudinal sectional view, on an enlarged scale, through one of the rollers which support the work rotating and driving spindle.

A grinding machine has been illustrated in the drawings comprising a base 10 which serves as a support for a longitudinally movable work supporting table 11. The work supporting table 11 serves as a support for a pair of footstocks 12 and 13 which are provided with work supporting and locating centers 14 and 15, respectively. The work centers 14 and 15 serve to locate and support a relatively long, irregularly shaped work piece 16.

A manually operable traverse mechanism is provided for traversing the work table 11 longitudinally to position the work piece for a grinding operation, comprising a manually operable traverse wheel 17. This manually operable traverse mechanism is not considered to be part of the present invention; consequently it has not been illustrated and described in detail. This mechanism is substantially the same as that shown in the expired U. S. patent to Charles H. Norton et al. No. 1,299,765, dated April 8, 1919, to which reference may be had for details of disclosure not contained herein.

The base 11 serves as a support for a grinding wheel slide (not shown) which in turn supports a plurality of spaced grinding wheels 18. A manually operable feeding mechanism is provided for feeding the grinding wheel transversely relative to the base 10, comprising a manually operable feed wheel 19. This feeding mechanism has not been illustrated and described in detail since it is not considered to be a part of the present invention. This mechanism may be substantially identical with that shown in the expired U. S. patent to Charles H. Norton, No. 762,838, dated June 14, 1904, to which reference may be had for details of disclosure not contained herein.

In order to rotate the relatively long, irregularly shaped work piece 16 while supported on the centers 14 and 15, a chucking and driving mechanism or head is provided comprising a frame 20 which is supported on the work table 11. The frame 20 serves as a support for a hollow work receiving drum or spindle 21. The spindle 21 is preferably supported by two sets of spaced antifriction rollers which are preferably located adjacent to the ends of the frame 20. The right-hand end of the spindle 21 (Fig. 4) is rotatably supported by rollers 22, 23 and 24. The left-hand end of the spindle 21 (Fig. 4) is supported by three spaced rollers 25, 26 and 27. These rollers serve as an anti-friction support for the spindle 21 so that it may be freely rotated to rotate a work piece 16 during a grinding operation. Each of the rollers 22 to 27 inclusive is provided with an eccentric mounting whereby the position of the roller may be readily adjusted in setting up the spindle so that its axis of rotation is parallel to the work supporting centers 14 and 15. This adjustment also serves to facilitate taking up lost motion between the spindle 21 and the supporting rollers.

The details of only one of the roller mountings has been illustrated in Fig. 5. All the remaining rollers are identically mounted on the frame 20. The roller 26 (Fig. 5) is supported on an anti-friction bearing 30 which is in turn supported on an eccentric portion 31 of the supporting stud 32. One end of the stud 32 is supported in a bearing surface 33 formed in the frame 20, and the other end of the stud 32 is supported in a bearing surface 34 which is formed in a bushing 36. The bushing 36 is rotatably supported in a bearing surface 37 formed in the frame 20. In order to facilitate adjusting the stud 32 so as to vary the position of the eccentric portion 31, a rotatable adjusting screw or worm 35 is provided on the frame 20, which engages the worm teeth cut in the periphery of the portion 32 of the supporting stud. In order to facilitate clamping the inner race ring of the bearing 30 to the stud 32, the right-hand end of the stud 32 is provided with a screw thread 38, and the extreme right-hand end is provided with a hexagonally shaped projection 39. A locking nut 40 is provided on the threaded portion 38. It will be readily apparent from the foregoing disclosure that a wrench may be applied to the hexagonal portion 39 while a second wrench is applied to the nut 40 so that the clamping nut 40 may be tightened to lock the center raceway of the bearing 30 in position relative to the eccentric portion 31 of the stud 32. As previously stated, all the rollers 22–27 inclusive are provided with substantially the same adjusting mechanism to facilitate aligning the spindle 21 and also to take up and adjust for wear of the bearing parts.

The spindle 21 is preferably positively driven by means of an electric motor 41. The motor 41 is mounted on a pivotally mounted platen 42. The lower end of the platen 42 is pivotally connected by studs 43 with a supporting bracket 44 which is fastened to the frame 20. The upper end of the platen 42 is provided with a pivotally mounted nut 45 having an adjusting screw 46 passing therethrough. One end of the adjusting screw 46 is anchored by a stud 47 to the frame 20. It will be readily apparent from the foregoing disclosure that by rotating the nut 45, the motor supporting platen 42 may be adjusted so as to tension the driving belt to be hereinafter described. The motor 41 is provided with a multiple V-groove pulley 50 which is connected by multiple V-belts 51 with a multi-V-groove pulley 52 which is mounted on the right-hand end of the spindle 21.

In order to support a long, irregularly shaped work piece, a pair of work supporting and driving chucks 54 and 55 are adjustably mounted at opposite ends of the spindle 21, respectively. The chuck 54 comprises a ring-shaped member 56 (Fig. 2) which is clamped in adjusted position on the right-hand end of the spindle 21 by means of a plurality of adjusting screws 57, 58, 59 and 60. The adjusting screws 57, 58, 59 and 60 pass through elongated arcuate-shaped slots 61, 62, 63 and 64 formed in the chuck ring 56 and are screw threaded into the end of the spindle 21. It will be readily apparent that by loosening the screws 57, 58, 59 and 60, the chuck ring 56 may be adjusted rotarily relative to the spindle 21 so as to facilitate adjustment thereof when desired.

The chuck ring 56 is provided with a pair of pivotally mounted arms 65 and 66 which are pivotally supported by studs 67 and 68 (Fig. 2). The upper ends of the arms 65 and 66 are arranged to be clamped in an operative position by means of clamping knobs 69 and 70. The upper ends of the arms 65 and 66 are provided with U-shaped slots 71 and 72 which swing into engagement with screws 73 and 74. It will be readily apparent from the foregoing disclosure that by loosening the nuts 69 and 70 which are screw threaded onto the screws 73 and 74, the arms 65 and 66 may be swung to an inoperative position to facilitate inserting a relatively long, irregularly shaped work piece 16 within the spindle 21 or removing it therefrom. The arm 65 is provided with a pair of spaced clamping screws 75 and 76. The arm 66 is provided with a pair of spaced clamping screws 77 and 78 which are arranged in opposed relationship with the clamping screws 75 and 76, respectively. These opposed clamping screws are arranged to engage opposite side faces of the relatively long, irregularly shaped work piece 16 so as to support and drive the work piece while supported on centers 14 and 15.

Similarly, the chuck 55 comprises a chuck ring 80 which is provided with a plurality of elongated arcuate slots 81, 82, 83 and 84 (Fig. 3). Clamping screws 85, 86, 87 and 88 pass through the elongated slots 81, 82, 83 and 84, respectively, and are screw threaded into the end of the spindle 21. It will be readily apparent from the foregoing disclosure that the chuck ring 80 may be adjusted relative to the spindle 21 by loosening the clamping screws 85, 86, 87 and 88 and then rotarily adjusting the ring 80 in either direction relative to the spindle 21, after which it may again be clamped in adjusted position.

The chuck ring 80 serves as a support for a pair of pivotally mounted clamping arms 89 and 90 which are supported by pivot studs 91 and 92, respectively. The pivot studs 91 and 92 are fixedly supported relative to the chuck ring 80. The upper ends of the arms 89 and 90 are provided with U-shaped notches 93 and 94, respectively, which are arranged to straddle a pair of screws 95 and 96 when the arms 89 and 90 are in operative positions. The screws 95 and 96 are fixedly mounted on the chuck ring 80. A pair of clamping knobs or nuts 97 and 98 are mounted on the screws 95 and 96, respectively, by means of which the clamping arms 89 and 90 may be clamped in an operative position.

The clamping arm 89 is provided with a pair of clamping screws 100 and 101 which are arranged to engage spaced portions on one side of the work piece 16. Similarly, the clamping arm 90 is provided with a pair of spaced clamping screws 102 and 103 which are arranged to engage the opposite face of the work piece 16. The screws 102 and 103 are arranged to engage the work piece 16 at points substantially opposite the clamping screws 100 and 101, respectively.

In order to facilitate clamping and rotating a work piece in the improved work supporting and rotating head without deflecting the axis thereof, it is desirable to provide suitable visible indicating means which may be readily observed during a chucking operation so that the work piece 16 may be clamped in an operative position within the spindle 21 without deflecting its axis while it is supported on the centers 14 and 15. This visible indicating mechanism may comprise a dial indicator 105 which is mounted in a slidably mounted frame 106. The frame 106 is provided with a plurality of elongated slots through which clamping screws 107, 108, 109 and 110 pass and are screw threaded into the arm 66. When it is desired to clamp the work piece 16 in position within the spindle 21, the screws are loosened and the frame 106 moved toward the work piece 16 until the actuating plunger 111 of the dial indicator 105 engages the work piece and the dial indicator needle reads zero. The frame 106 may then be clamped in adjusted position, after which the work clamping screws 75, 76, 77 and 78 may be adjusted to clamp the work piece 16. During this clamping operation, the operator watches the dial indicator 105 and may readily adjust these clamping screws to clamp the work piece 16 relative to the chuck 54 without deflecting the axis of the work piece 16 while supported on the centers 14 and 15.

Similarly, the work chuck 55 is provided with a visible indicating means comprising a dial indicator 115 which is mounted in a slidably adjustable frame 16. The details of the support for the frame 116 have not been illustrated in the drawings, since the support is substantially identical with that shown in connection with the frame 106 previously described. It will be readily apparent that when it is desired to clamp the work piece 16 within the chuck 55, the frame 116 is first moved into an operative position so that the actuating plunger of the dial indicator 115 engages the work piece 16 when the dial indicator needle reads zero, after which the frame 116 is clamped in adjusted position. While the dial indicator 115 is in this position, the clamping screws 100, 101, 102 and 103 may be readily adjusted to clamp the work piece 16 in driving relation with the chuck 55 without deflecting the axis of the work piece 16 while supported on the work centers 14 and 15.

The operation of this improved work supporting and rotating mechanism will be readily apparent from the foregoing disclosure. The chuck arms 65, 66, 89 and 90 are swung to inoperative positions about their supporting pivots, after which a work piece 16 may be passed through the central aperture in the spindle 21 and the centers 14 and 15 adjusted into position to support the work piece 16. After the work piece 16 has been supported on centers, the clamping arms 65 and 66 of the chuck 54 and the clamping arms 89 and 90 of the chuck 55 may be swung and clamped in operative positions (Figs. 2 and 3), as illustrated in Figs. 2 and 3. After the chuck parts are in this position, the frames 106 and 116 supporting the dial indicators 105 and 115, respectively, are positioned with the dial indicator actuating plungers in operative engagement with the work piece 16 so that the respective needles of the indicators 105 and 115 read zero, after which the work clamping screws 75, 76, 77 and 78 of the chuck 54 and screws 100, 101, 102 and 103 of the chuck 55 may be readily adjusted to clamp the work piece 16 without deflecting its axis while supported on the work supporting centers 14 and 15. After the work piece 16 has been thus clamped in position in the chucks 54 and 55, it may be rotated while supported on the centers 14 and 15 by starting the electric motor 41 to drive the spindle 21 and the chucks 54 and 55, respectively, during a grinding operation.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a grinding machine having a rotatable work support including a hollow rotatable spindle, means including an electric motor to rotate said spindle and a pair of work supporting and driving chucks on opposite ends of said spindle, each of said chucks including a pair of spaced pivotally mounted arms arranged on opposite sides of a work piece passing through said chuck, a plurality of opposed clamping screws on each of said arms to engage and support a portion of the work piece therebetween, and means rotarily to adjust at least one of said chucks relative to said spindle to facilitate positioning said arms and clamping screws relative to the surface of a work piece.

2. In a grinding machine having a rotatable work support including a hollow rotatable spindle, means including an electric motor to rotate said spindle and a pair of work supporting and driving chucks on opposite ends of said spindle, a pair of independent spaced pivotally mounted arms on each of said chucks arranged on opposite sides of a work piece passing through said chuck, said arms being arranged to swing to inoperative positions to facilitate loading work pieces, independent means to lock each of said arms in operative positions, and a plurality of opposed clamping screws on each of said arms to engage and support a portion of the work piece therebetween.

3. In a grinding machine having a rotatable work support including a hollow rotatable spindle, means including an electric motor to rotate said spindle, a pair of spaced work supporting centers to support and align an irregularly shaped work piece, and a pair of work supporting and driving chucks on opposite ends of said spindle, a pair of independent spaced pivotally mounted arms on each of said chucks arranged on opposite sides of a work piece, independent means to clamp each of said arms in an operative position, and a plurality of clamping screws on each of said arms to engage and support a portion of the work piece therebetween.

4. In a grinding machine having a rotatable work support including a hollow rotatable spindle, means including an electric motor to rotate said spindle, a pair of spaced work supporting centers to support and align an irregularly shaped work piece, and a pair of work supporting and driving chucks on opposite ends of said spindle, each of said chucks including a pair of spaced pivotally mounted arms arranged on opposite sides of a work piece, independent pivot studs on each of said chucks for each of said arms, said arms being arranged to swing to inoperative positions to facilitate loading work pieces, independent means to lock each of said arms in operative positions, and a plurality of clamping screws on each of said arms to engage and support a portion of the work piece therebetween.

5. In a grinding machine having a longitudinally movable table, a rotatable work support on said table including a hollow rotatable work spindle, means including an electric motor to rotate said spindle, a pair of spaced work supporting centers on said table which are spaced from opposite ends of said spindle to support and align an irregularly shaped work piece which extends through said spindle, and a pair of adjustably mounted work supporting and driving chucks on opposite ends of said spindle, a pair of independent spaced pivotally mounted arms on each of said chucks arranged on opposite sides of the work piece an independent fixed pivot stud on each of said chucks for one end of each of said arms, independent clamping means on said chucks for the other end of each of said arms, and a plurality of clamping screws on each of said arms to engage and support a portion of the work piece therebetween.

6. In a grinding machine having a longitudinally movable work table, a rotatable work support on said table including a hollow rotatable spindle, means including an electric motor to rotate said spindle, a pair of spaced work centers on said table which are spaced from opposite ends of said spindle to support and align an irregularly shaped work piece which extends through said spindle, and a pair of work supporting and driving chucks adjustably mounted on opposite ends of said spindle, said chucks including an annular ring adjustably mounted on each end of said spindle, a pair of spaced pivotally mounted arms arranged as chords across said ring, means to clamp said arms in an operative position, and a plurality of opposed clamping screws on each of said arms to engage opposed faces on a work piece.

7. In a grinding machine having a rotatable work support including a hollow rotatable work spindle, means to rotate said spindle, a pair of work supporting centers to support and align an irregularly shaped work piece, a pair of work supporting and driving chucks adjustably mounted on opposite ends of said spindle, each of said driving chucks having a pair of spaced arms arranged on opposite sides of a work piece, a plurality of clamping screws on each of said arms to engage and support a portion of the work piece therebetween, and visible indicating means to facilitate adjusting said clamping screws to clamp a work piece in said chucks without deflecting the work axis during said clamping operation.

8. In a grinding machine having a rotatable work support including a hollow rotatable work spindle, means to rotate said spindle, a pair of work supporting centers to support and align an irregularly shaped work piece, a pair of work supporting and driving chucks adjustably mounted on opposite ends of said spindle, each of said driving chucks having a pair of spaced arms arranged on opposite sides of a work piece, a plurality of clamping screws on each of said arms to engage and support a portion of the work piece therebetween, and visible indicating means adjustably mounted on one arm of each of said chucks to facilitate adjusting said clamping screws to clamp a work piece in said chucks without deflecting the work axis during said clamping operation.

9. In a grinding machine as claimed in claim 7, the combination with the parts and features therein specified, of a slidably mounted dial gauge on one arm of each of said chucks, means to clamp said dial gauges in an adjusted position on said arms with the gauge plunger in operative engagement with a work piece supported on said centers to facilitate adjusting said clamping screws without deflecting the work axis.

CARL G. FLYGARE.